(12) United States Patent
Fletcher

(10) Patent No.: US 7,245,824 B2
(45) Date of Patent: Jul. 17, 2007

(54) IMAGE INDEXING SYSTEMS

(76) Inventor: Ian Fletcher, Church Farm, Kirk Ireton, Derbyshire, DE6 3JX (GB)

( * ) Notice: Subject to any disclaimer, the term of this patent is extended or adjusted under 35 U.S.C. 154(b) by 1095 days.

(21) Appl. No.: 10/220,954

(22) PCT Filed: Mar. 7, 2001

(86) PCT No.: PCT/GB01/00991

§ 371 (c)(1),
(2), (4) Date: Nov. 25, 2002

(87) PCT Pub. No.: WO01/67455

PCT Pub. Date: Sep. 13, 2001

(65) Prior Publication Data

US 2003/0147623 A1   Aug. 7, 2003

(30) Foreign Application Priority Data

Mar. 7, 2000   (GB) ................................. 0005496.5

(51) Int. Cl.
H04N 5/91 (2006.01)
H04N 7/00 (2006.01)
(52) U.S. Cl. ...................................................... 386/95
(58) Field of Classification Search .................... 386/1, 386/45, 69–70, 95, 125–126; 348/700–702, 348/397.1–398.1, 420.1–421.1
See application file for complete search history.

(56) References Cited

U.S. PATENT DOCUMENTS

| 5,790,695 | A | * | 8/1998 | Suwa | ......................... 382/166 |
| 5,805,733 | A | | 9/1998 | Wang et al. | |
| 5,969,755 | A | | 10/1999 | Courtney | |
| 5,995,641 | A | * | 11/1999 | Yamaguchi | .................. 382/124 |

OTHER PUBLICATIONS

International Search Report, PCT/GB01/00991, Aug. 26, 2002, pp. 1-6.

* cited by examiner

Primary Examiner—Jeffrey Stucker
Assistant Examiner—Tat Chi Chio
(74) Attorney, Agent, or Firm—Connolly Bove Lodge & Hutz LLP

(57) ABSTRACT

An image indexing system comprising a video frame store, an averager which provides a first signal indicative of the average brightness level of each frame stored, an image splitter and averager which divides each frame into contiguous blocks of pixels, and provides for each block, a second signal indicative of its average brightness level, a comparator which compares each of the second signals with the first signal so as to produce in respect of each block a binary signal indicative of whether or not its brightness level, as indicated by the first signal, is greater or less than the average brightness level for the frame as indicated by the first signal, thereby to produce for each frame, an index signal comprising one binary bit for each block which serves to identify each frame for indexing purposes.

14 Claims, 4 Drawing Sheets

Step 1 Monochrome Conversion

Step 2 Average brightness computed for rectangular areas of image

Step 3 Completed fingerprint is then stored as binary string

IMAGE INDEXING SYSTEMS

This invention relates to image indexing systems and more especially it relates to systems for the indexing of video images.

There is a requirement for tagging each frame, or group of frames of a video clip for example, with a characteristic index number so that a mass of video material can be rapidly searched in order to identify a particular frame or group of frames having the same index number.

It is readily apparent that such an indexing system may find a wide variety of applications wherein automatic searching through video material is required in order to find a particular image or indeed in order to establish whether a particular image is present in the material searched.

It is an object of this invention to provide a video image identification system which is comparatively simple and inexpensive to produce, wherein image identification is effected with a high degree of confidence.

According to the present invention, an image indexing system comprises a video frame store, an averager which provides a first signal indicative of the average brightness level of each frame stored, an image splitter and averager which divides each frame into contiguous blocks of pixels, and provides for each block, a second signal indicative of its average brightness level, a comparator which compares each of the second signals with the first signal so as to produce in respect of each block a binary signal indicative of whether or not its brightness level, as indicated by the first signal, is greater or less than the average brightness level for the frame as indicated by the first signal, thereby to produce for each frame, an index signal comprising one binary bit for each block which serves to identify each frame for indexing purposes.

In the case of colour images, data representative of the image may first be converted to monochrome using RGB averaging in order to provide monochrome data for the frame store.

The overall average brightness level may be computed for each frame by averaging the brightness level of all pixels which comprise the frame.

The imager splitter may operate to divide each fame into rows and columns of contiguous rectangular pixel blocks.

The indexing system may form a part of image identification apparatus which additionally comprises a database in which the binary index for each of a plurality of images is stored and a further comparator wherein a binary index of an image to be identified as established by the image indexing system, is compared with the indices stored thereby to provide an output signal if the index of the image to be identified corresponds to the index of a stored image, the output signal including data which identifies the stored image in respect of which correspondence obtains.

The output signal my also include confidence level data derived in dependence upon the degree of correspondence which obtains between the index of an image to be identified and the indices of stored images.

The system may include a confidence level threshold detector whereby images may be selected from the store if a predetermined percentage match obtains between the index of a stored image and the index of an image to be identified.

It may be arranged that the threshold for selection is arranged to be variable so that it can be set to correspond to a predetermined percentage match.

One embodiment of the invention will now be described by way of example only with reference to the accompanying drawings in which.

Figure 1:
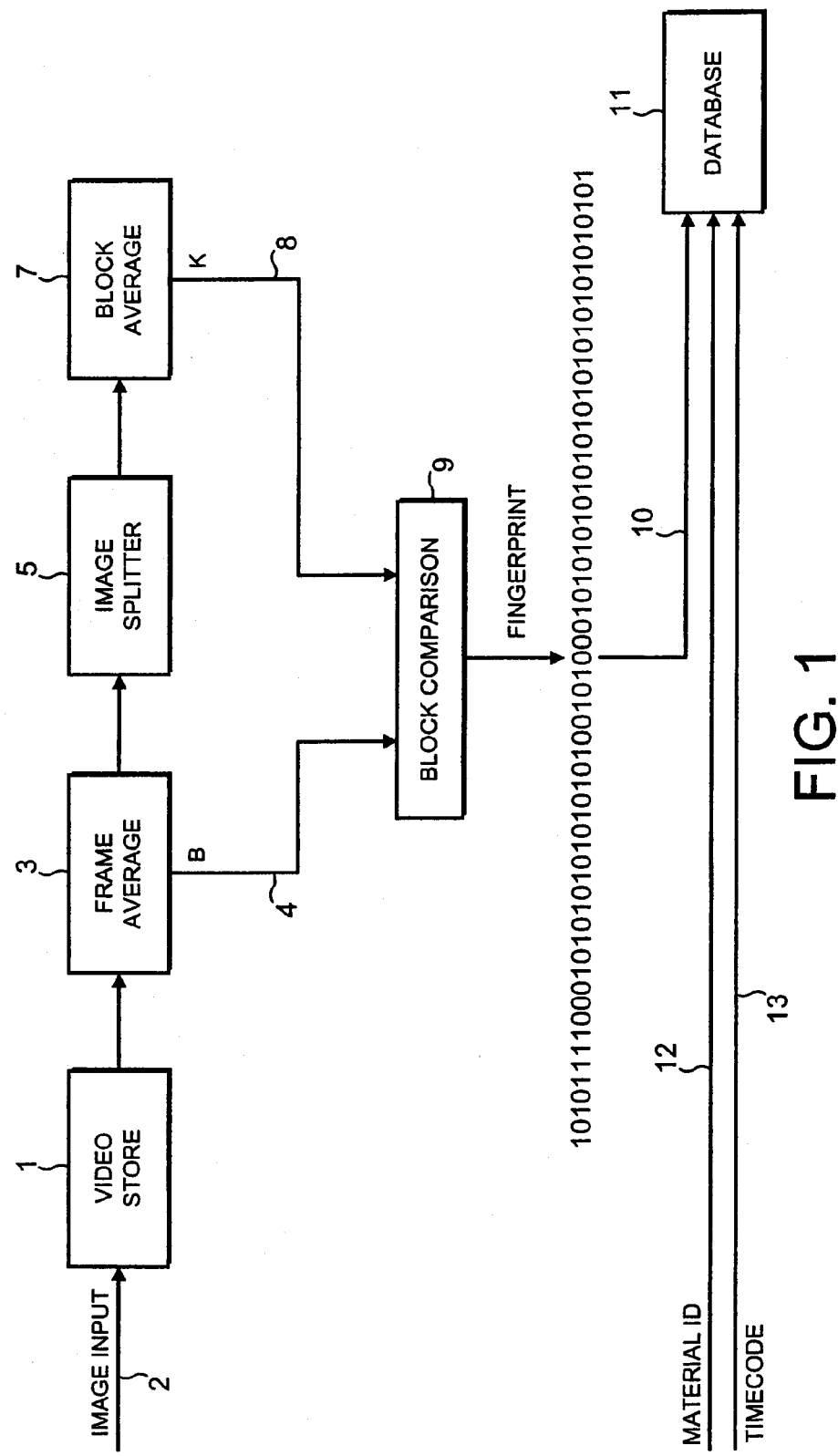
FIG. 1, is a generally schematic block diagram of an image indexing system.
Figure 4:
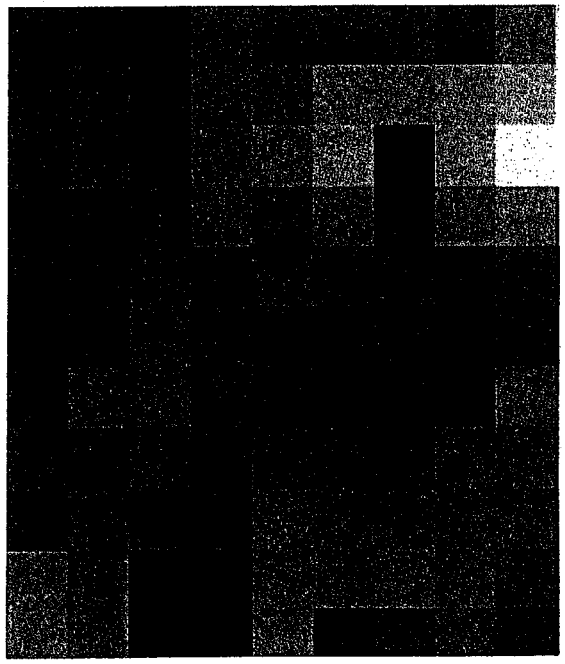
FIG. 4, shows a multi block representation of the image of FIG. 3.

Referring now to FIG. 1, an image indexing system comprises a video store 1, for monochrome data corresponding to an image frame, which is fed thereto via an input line 2. The pixels which comprise each frame are sampled in a frame averager 3, thereby to produce a signal on a line 4, which corresponds to the average brightness level B, of each frame. The image data from the video store is also fed to an image splitter 5, which serves to divide the image into a number of contiguous rows and columns of pixel blocks 6, as shown in FIG. 4, the grey scale brightness level of each of the blocks 6, being determined by a block averager 7, which provides in respect of each block, a brightness level signal K, on a line 8, thereby to produce for the whole frame a grey scale image comprising blocks 6, as shown in FIG. 4.

Figure 5:
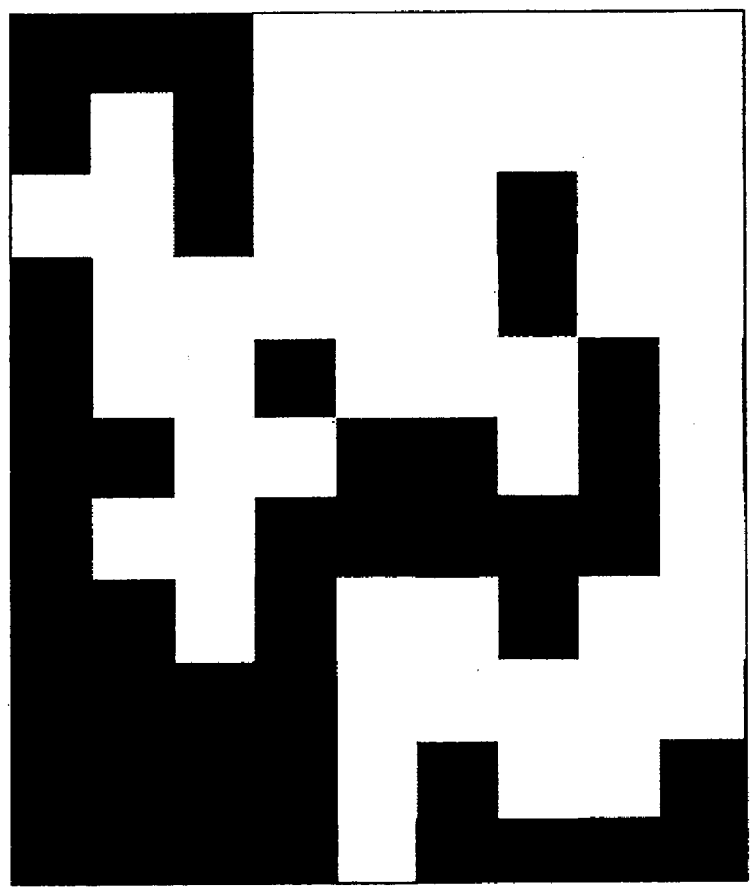
FIG. 5, is a block representation of index signals corresponding to FIGS. 3 and 4.

The signals B and K on the lines 4 and 8 respectively, are fed to a block comparator unit 9, wherein a binary '1' or '0' decision is made in respect of each block which indicates whether it's brightness K, is greater or less than the brightness average B, of the frame, whereby an output signal is produced on a line 10, from the comparator unit 9, which comprises a series of '1's and '0's corresponding to a binary index signal characteristic of the frame, which index signal is represented graphically as shown clearly in FIG. 5.

The index signal on the line 10, is fed to a database 11, wherein it is stored along with other identifying data provided on lines 12 and 13, which serve to classify video material identity and time code respectively.

Figure 2:
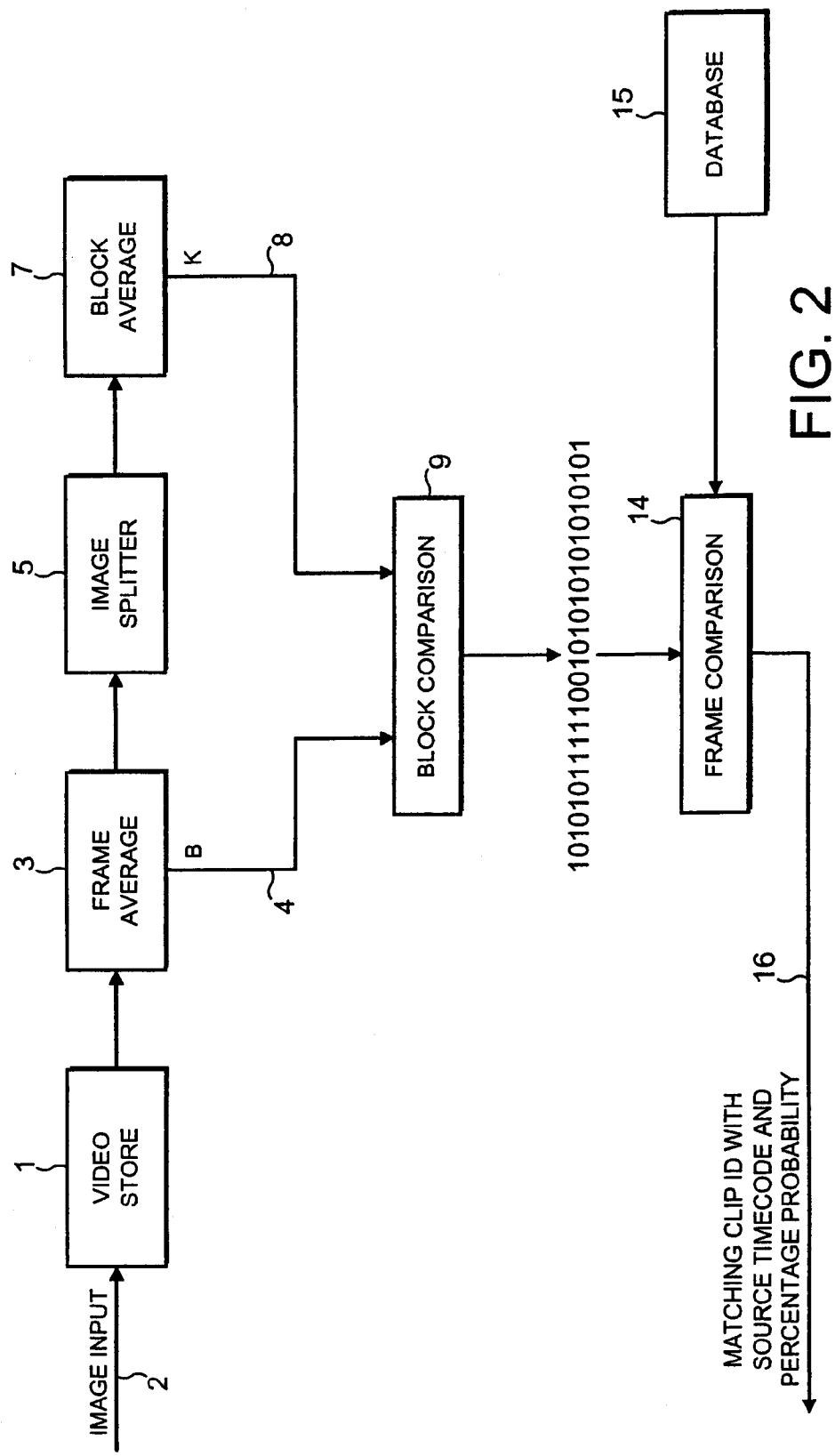
FIG. 2, is a generally schematic block diagram of image identification apparatus which embodies the system of FIG. 1, wherein corresponding parts bear the same numerical designations.
Figure 3:
FIG. 3, is one example of an image to be indexed.

As shown in FIG. 2, the systems shown in FIG. 1, may be used in image identification apparatus, in order to provide for searching of an index database to identify a particular frame or frames. Referring now to FIG. 2, the apparatus comprises, in addition to the system of FIG. 1, a further comparator 14, and a database 15, which may correspond substantially to the database 11, shown in FIG. 1. In operation of the apparatus the index of an image to be identified is fed to the further comparator 14, wherein it is compared with the indices of images stored in the database 15. An output signal from the further comparator 14, is arranged to be delivered on an output line 16, if full correspondence obtains between the index of the image to be identified and one of the indices stored in the database 15, the signal on the line 16, being arranged to include data which serves to identify which of the stored indices is selected. Although not shown in the drawing it is envisaged that in some circumstances a threshold detector may be provided which is settable to a level corresponding to predetermined percentage correspondence between the index of an image to be identified and the image as represented by indices stored.

It will be appreciated that in operation of the system as hereinbefore described, data appertaining to an image and produced on the line 10, is stored in the database bit by bit and when used in the apparatus as shown in FIG. 2, a score value as indicated by correspondence between an image to be identified and a stored image is progressively incremented, a potential match being indicated in dependence upon the score value. Thus a perfect score is deemed to be a perfect match and partial matches are scored accordingly.

It will be appreciated that accurate results may be obtained irrespective of colour brightness or resolution even when these characteristics tend to differ slightly from that of an ideal image.

It will further be appreciated that various modifications may be made to the arrangements hereinbefore described without departing from the scope of the invention and for example the databases 11 and 15, and or the stores maybe arranged to form a part of a commercially available computer/PC.

The invention claimed is:

1. An image indexing system comprising a video frame store, an averager which provides a first signal indicative of the average brightness level of each frame stored, an image splitter and averager which divides each frame into contiguous blocks of pixels, and provides for each block, a second signal indicative of its average brightness level, a comparator which compares each of the second signals with the first signal so as to produce in respect of each block a binary signal indicative of whether or not its brightness level, as indicated by the second signal, is greater or less than the average brightness level for the frame as indicated by the first signal, thereby to produce for each frame, an index signal comprising one binary bit for each block which serves to identify each frame for indexing purposes.

2. An image indexing system as claimed in claim 1, wherein data representative of an image is converted to monochrome using RGB averaging in order to provide monochrome data for the frame store.

3. An image indexing system as claimed in claim 2, wherein the overall average brightness level is computed for each frame by averaging the brightness level of all pixels which comprise the frame.

4. An image indexing system as claimed in claim 2, wherein the imager splitter operates to divide each frame into rows and columns of contiguous rectangular pixel blocks.

5. An image indexing system as claimed in claim 2 which forms a part of image identification apparatus and which additionally comprises a database in which the binary index for each of a plurality of images is stored and a further comparator wherein an index of an image to be identified as established by the image indexing system, is compared with indices stored in the database, thereby to provide an output signal when the index of the image to be identified corresponds to the index of a stored image, the output signal including data which identifies the stored image in respect of which correspondence obtains.

6. An image indexing system as claimed in claim 1, wherein the overall average brightness level is computed for each frame by averaging the brightness level of all pixels which comprise the frame.

7. An image indexing system as claimed in claim 6, wherein the imager splitter operates to divide each frame into rows and columns of contiguous rectangular pixel blocks.

8. An image indexing system as claimed in claim 6 which forms a part of image identification apparatus and which additionally comprises a database in which the binary index for each of a plurality of images is stored and a further comparator wherein an index of an image to be identified as established by the image indexing system, is compared with indices stored in the database, thereby to provide an output signal when the index of the image to be identified corresponds to the index of a stored image, the output signal including data which identifies the stored image in respect of which correspondence obtains.

9. An image indexing system as claimed in claim 1, wherein the imager splitter operates to divide each frame into rows and columns of contiguous rectangular pixel blocks.

10. An image indexing system as claimed in claim 9 which forms a part of image identification apparatus and which additionally comprises a database in which the binary index for each of a plurality of images is stored and a further comparator wherein an index of an image to be identified as established by the image indexing system, is compared with indices stored in the database, thereby to provide an output signal when the index of the image to be identified corresponds to the index of a stored image, the output signal including data which identifies the stored image in respect of which correspondence obtains.

11. An image indexing system as claimed in claim 1 which forms a part of image identification apparatus and which additionally comprises a database in which the binary index for each of a plurality of images is stored and a further comparator wherein an index of an image to be identified as established by the image indexing system, is compared with indices stored in the database, thereby to provide an output signal when the index of the image to be identified corresponds to the index of a stored image, the output signal including data which identifies the stored image in respect of which correspondence obtains.

12. An image indexing system as claimed in claim 11, wherein the output signal includes confidence level data derived in dependence upon the degree of correspondence which obtains between the index of an image to be identified and the indices of corresponding to stored images.

13. An image indexing system as claimed in claim 12, wherein the system includes a confidence level threshold detector whereby stored images are identified if a predetermined percentage match obtains between the index of a stored image and the index of an image to be identified.

14. An image indexing system as claimed in claim 11, wherein the system includes a confidence level threshold detector whereby stored images are identified if a predetermined percentage match obtains between the index of a stored image and the index of an image to be identified.

* * * * *